United States Patent [19]

Eiermann

[11] Patent Number: 4,717,319

[45] Date of Patent: Jan. 5, 1988

[54] HOUSING OF A ROTARY PISTON INTERNAL COMBUSTION ENGINE

[75] Inventor: Dankwart Eiermann, Weissensberg, Fed. Rep. of Germany

[73] Assignee: Wankel GmbH, Berlin, Fed. Rep. of Germany

[21] Appl. No.: 876,196

[22] Filed: Jun. 19, 1986

[30] Foreign Application Priority Data

Feb. 13, 1986 [DE] Fed. Rep. of Germany ....... 3604428

[51] Int. Cl.⁴ ......................... F01C 1/22; F01C 21/10; F16M 1/04
[52] U.S. Cl. .................................... 418/60; 418/61 A; 418/270; 267/161; 403/337; 403/338
[58] Field of Search .............. 418/60, 61 A, 107–109, 418/270; 403/335–338; 123/234, 242; 267/161, 164

[56] References Cited

U.S. PATENT DOCUMENTS

| | | | |
|---|---|---|---|
| 2,404,385 | 7/1946 | Fritts | 403/337 |
| 3,400,692 | 9/1968 | Jones | 418/60 |
| 3,941,526 | 3/1976 | Kutkus | 418/60 |
| 4,035,112 | 7/1977 | Hackbarth et al. | 418/60 |

Primary Examiner—John J. Vrablik
Attorney, Agent, or Firm—Becker & Becker, Inc.

[57] ABSTRACT

A housing of a rotary piston internal combustion engine of trochoidal type of construction consists of two side parts and at least one mantle part with dual-curvature mantle runway and a center part between the two mantle parts, which parts are connected by adjustable bolts directed axially as arranged along the radial periphery of the housing. An eccentric shaft passes through the housing and a triangular rotary piston turns upon the eccentric of the eccentric shaft. Clamping rings are provided at each of two ends of the housing. The clamping rings are circular in axial plan view and have a diameter equal to the length of the long axis of the housing and have a transition in radial direction via the housing in a region of the short axis thereof; the clamping rings are connected by adjustable bolts in a region of the short axis of the housing; a disc or cup spring is arranged at one of the two clamping rings and the cup spring is pressed by tensioning of the adjustable bolts by the clamping ring against the end of the housing as well as pressing the housing against the other clamping ring. The cup spring engages against a steel ring introduced in an end of the housing.

4 Claims, 2 Drawing Figures

HOUSING OF A ROTARY PISTON INTERNAL COMBUSTION ENGINE

BACKGROUND OF THE INVENTION

1. Field of the Invention

The present invention relates to a housing of a rotary piston internal combustion engine of trochoidal manner of construction which consists of two side parts and at least one mantle part or shell with dual-arc mantle runway and a central part between the two mantle parts, such parts being connected by axially directed tension rods, tie rods or tie bars arranged along the radial periphery of the housing; and the housing has an eccentric shaft passing therethrough; upon eccentrics of the eccentric shaft respectively there is provided a triangular piston having corners thereof continuously in engagement with the mantle runway.

2. Description of the Prior Art

At least twelve axial tie rods were necessary for a sufficient and adequate connection of the indicated housing parts according to the state of the prior art, in order to obtain a complete sealing of the working chambers and cooling chambers outwardly thereof and among each other as well as a complete torsional stiffness of the housing. These tensioning or clamping screws had to be arranged externally of the cooling chambers respectively cooling ribs along a radial edge of the housing, especially in a region of the long axis of the mantle runway trochoidal configuration in ears or flanges externally of the actual housing, which with that was enlarged considerably in the radial extent thereof. With that, an essential and important advantage of the originally mentioned type of rotary piston engine is influenced considerably, namely the small end face respectively the advantage of small or nominal radial extension or expansion of such a motor or rotary piston engine in relationship to the capacity, efficiency or performance thereof. Most of all, the mounting, attachment or placing of this large number of anchoring or tension rods or adjustable bolts as well as the alignment or orientation and the fitting or adjustment thereof represents a considerable assembly expenditure. The staying, spanning or bracing with tie rods or bars, anchoring rods or adjustable bolts most of all produces the disadvantage that the engagement pressure effected thereby is distributed irregularly or nonuniformly in the sections or segments between the anchoring rods or adjustable bolts and can go as far as zero. A blowing-through or blow-by then occurs and with fluid or liquid cooling there is encountered an entry of gas into the cooling fluid which can destroy the engine via partial elimination of the cooling. Also it is difficult to maintain the engagement pressure uniformly or equal with all screws and to avoid uncontrolled, non-axially extending inner stresses of the housing. These disadvantages are not avoidable also via placement of a large number of tensioning rods, anchoring rods or adjustable bolts.

SUMMARY OF THE INVENTION

An object of the present invention on the one hand is to accomplish a simplification of the assembly of the housing and on the other hand to provide a construction, with which the radial extension of the machine or engine in the region of the long housing axis is limited or restricted to the measure or extent necessary for the cooling chambers and in the region of the short housing axis to be limited or restricted to a circle, of which the diameter is determined by the length of the long housing axis. With that, when referring to a housing axis, there is to be understood to be meant on the one hand the longest and on the other hand the shortest extension of the housing in a radial plane. With that there is attained that the engine or machine in radial cross section has the smallest possible extension and is circular, which would be especially advantageous for installation particularly with aircraft engines. Especially, with direct tension rod or adjustable bolt connection there is to be avoided irregular or nonuniform tightening of the sealing limits of the individual housing parts among each other, and finally, in spite of this simplified construction and manner of assembly, there is to be avoided any distortion or twisting, contortion or warping of the individual housing parts among each other.

This object, and other objects and advantages of the present invention, will appear more clearly from the following specification in conjunction with the accompanying drawings.

BRIEF DESCRIPTION OF THE DRAWINGS

FIG. 1 is a front end plan view of a housing according to the present invention with various cutting or breaking through.

DETAILED DESCRIPTION

Figure 1:
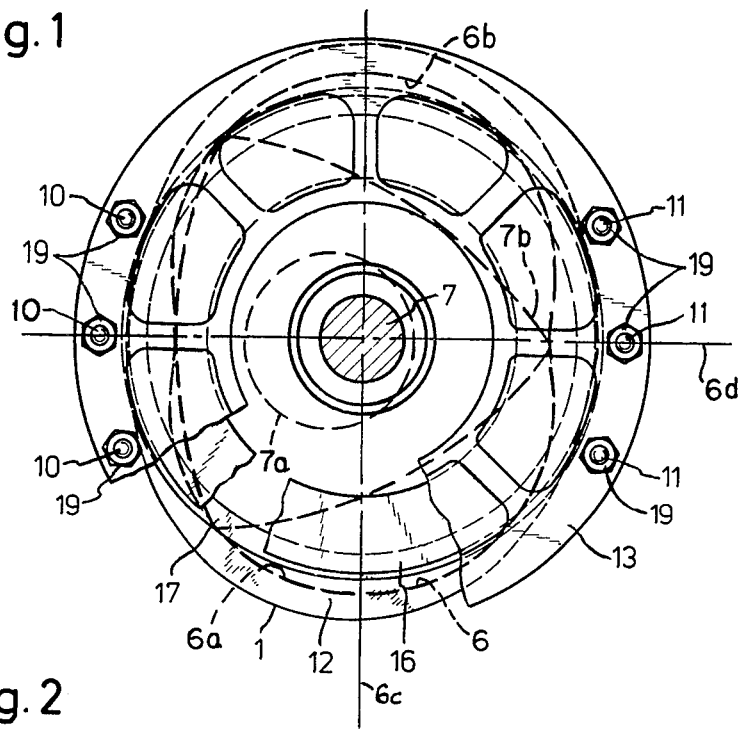
Figure 2:
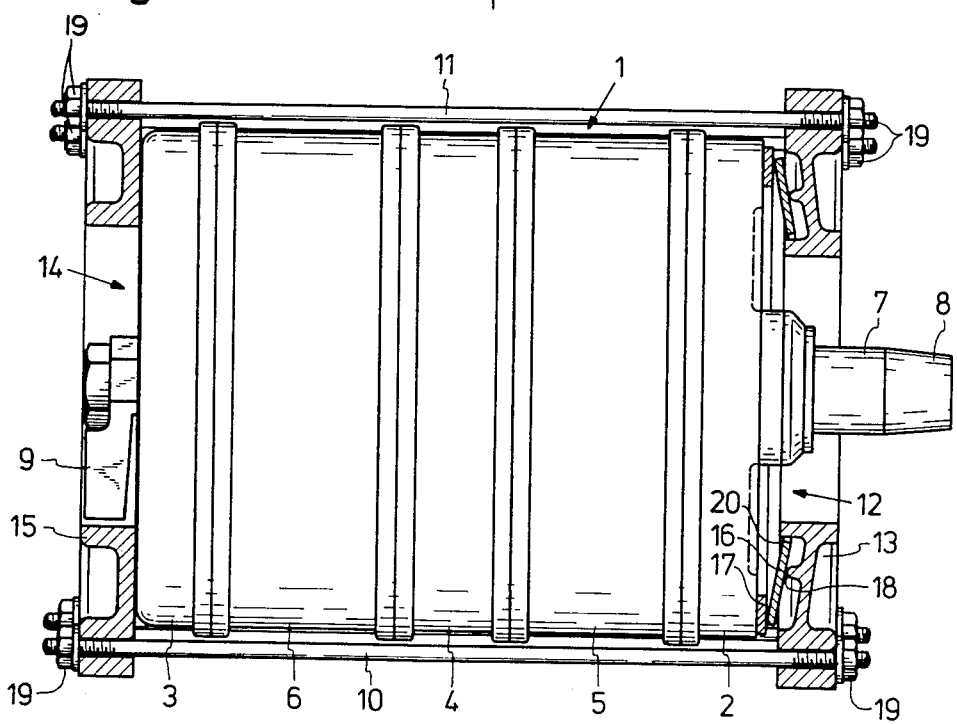
FIG. 2 is a side view of the same housing with partial sections.

Referring now to the drawings in detail, the housing 1 shown in the drawings is that of a dual-disk rotary piston combustion engine of trochoidal manner of construction of the type set forth in the introduction. The housing 1 consists of the two side parts 2 and 3, the middle or center part 4 and the mantle parts 5 and 6 arranged therebetween. These mantle parts 5 on an inner side thereof have mantle runway means 6 in a shape of a trochoid with dualcurvature arcs 6a and 6b of which outermost points are intersected by a long axis 6c of the trochoid and axially closest points thereof are intersected by a short axis 6d of the trochoid. The eccentric shaft 7 mounted or journalled in the side parts 2 and 3 provides a power take-off or output trunnion at 8 and a counterweight at 9; triangular pistons 7b rotate upon eccentrics 7a of the eccentric shaft 7. The housing parts 2,3,4,5, and 6 are connected by respectively three anchoring or tensioning rods or adjustable bolts 10 and 11 at oppositely located sides in a region of the shortest housing axis. The anchoring or tension rods or adjustable bolts on an output side 12 of the housing are bolted with the clamping, stressing or tightening ring 13 and are bolted upon an oppositely located front side or end 14 of the housing 1 with a clamping, tightening or stressing ring 15. The clamping ring 15 lies or engages flat directly upon the face or front surface 14 of the side part 3. Between the clamping ring 13 and the output-side side part 2 there is arranged a cup spring 16, which on the one hand engages against a steel ring 17 inserted into the front side or end 12 of this side part 2 consisting of aluminum and on the other hand engaging against a stop or check ring or end collar 18 of the clamping ring 13 nose-shaped in axial section and with tightening of the screws 19 being pressed against the housing 1 and this being pressed against the clamping ring 15.

The clamping rings 13 and 15 have a diameter equal to the length of the long housing axis, so that these clamping rings, since they are circular, project so far in the region of the short housing axis, that the tension or anchoring rod or adjustable bolt means 10 and 11 can be conducted or directed past adjoining or next to the housing 1. The housing 1 itself is pressed together between the clamping rings 15 and cup spring 16 stressed or acted upon up to the limit of elasticity or yield strength thereof by tensioning of the tension or anchoring rods or adjustable bolts 10 and 11 and thus being held together in the individual housing parts 2,3,4,5 and 6 thereof as a non-rotatable, non-twistable and undistortable unit or entirety. The surface or contact pressure or bearing pressure of the tension or anchoring rods or adjustable bolts 10 and 11 decreases moreover within the outline or layout of the cup spring 16 at the steel ring 17 toward the long housing axis in a slight or negligible extent actually, although the highest operating internal pressure, which counters the surface or contact pressure or bearing pressure of the cup spring 16, arises or is encountered in the region of the short axis, which means in and after the ignition dead center, accordingly there, where the tension or anchoring rods or adjustable bolts 10 and 11 are provided, while in the region of the range of the long housing axis pressed solely by the cup spring there exists on the one hand only the increasing compression force or pressure and upon the oppositely located side only the decreasing expansion pressure exists or is at hand therewith.

For facilitating the assembly and for setting or adjustment of the cup spring 16 in the concentric position thereof on the steel ring 17, the outer edge 20 of the cup spring 16 engages with small or nominal play against the edge 21 of the clamping ring 13 directed toward the output end, driving side or face 12 of the housing.

Via the present inventive arrangement of the clamping rings and the elimination of tension or anchoring rods or adjustable bolts made possible thereby in ears in the region of the long housing axis, the radial dimension or measured extent of the engine is limited or restricted to a radius equal to half the length of the long housing axis, whereby a cylinder shape results with this radius, which means there is obtained an engine with the smallest possible radial measurements or dimensions.

Clamping rings 13, 14 are provided on both of the ends or faces 12, 14 of the housing 1; the clamping rings 13, 15 are circular in axial plan view and have a diameter equal to the length of the long axis of the housing 1 and have a transition in radial direction via the housing 1 in a region of the short axis thereof; the clamping rings 13, 15 in the region of the short axis of the housing 1 are connected to tension or anchoring rods or adjustable bolts 10, 11; a disc or cup spring 16 is arranged between one of the two clamping rings 13 and adjoining the face or front end 12 of the housing 1, such cup spring 16 being pressed via the tensioning or tightening of the tension or anchoring rods or adjustment screws 10,11 by the clamping ring 13 against the end or face side 12 of the housing 1 as well as the housing 1 being pressed against the other clamping ring 15.

The disc or cup spring 16 engages against a steel ring 17 introduced in the end or face side 12 of the housing 1 and approximately centrally with the outer or external side against an abutment ring 18 nose-shaped in a radial section against the inner side of the clamping ring 13. The clamping ring 13 has an edge 21 directed toward the end or face side 12 of the housing 1; an outer edge 20 of the cup spring 16 engages against the edge 21 with a small or nominal play. Only in the region of the short axis of the housing 1 on both sides respectively are three tension or anchoring rods or adjustable bolts 10, 11 respectively provided therewith.

The present invention is, of course, in no way restricted to the specific disclosure of the specification and drawings, but also encompasses any modifications within the scope of the appended claims.

What I claim is:

1. A housing of a rotary piston internal combustion engine of trochoidal manner of construction, which consists of two side parts and at least two mantle parts with an inner surface in form of a trochoid with two lobes having outermost and innermost points as well as a long axis and a short axis of the trochoid, the outermost points of these lobes being intersected by the long axis and the innermost points being intersected by the short axis of the trochoid, and a center part between two mantle parts, which parts are connected along radial periphery of the housing by adjustable bolts directed axially, and having an eccentric shaft passing through the housing and including a triangular piston upon an eccentric of the eccentric shaft upon which the piston rotates in continuous engagement of the corners thereof with the mantle runway, comprising the following additional features including:

(a) clamping rings provided on each of two ends of the housing;
    (b) said claiming rings being circular in axial plan view and having a diameter equal to length of the long axis of said housing and including a transition in a radial direction via said housing in the region of the short axis thereof;
    (c) said clamping rings being connected via said adjustable bolts in the region of the short axis of said housing; and
    (d) a cup spring arranged between one of the two clamping rings and that engaging against said housing, said cup spring being pressed by tension of said adjustable bolts by said one clamping ring against an end of the housing as well as the housing being pressed against the other clamping ring.

2. A housing according to claim 1 wherein said cup spring engages against a steel ring introduced in an end of said housing and approximately centrally with an outer side thereof against an end collar nose-shaped in radial section engaging against an inner side of said clamping ring.

3. A housing according to claim 1 wherein said clamping ring toward an end of said housing has an edge against which an outer edge of said cup spring engages with a nominal play.

4. A housing according to claim 1 wherein only in a region of the short axis of said housing on both sides thereof respectively three adjustable bolts are provided.

* * * * *